(12) United States Patent
Saito et al.

(10) Patent No.: US 9,599,169 B2
(45) Date of Patent: Mar. 21, 2017

(54) LUBRICATING STRUCTURE FOR FRICTION ENGAGEMENT ELEMENT OF AUTOMATIC TRANSMISSION

(71) Applicant: JATCO Ltd, Fuji-shi, Shizuoka (JP)

(72) Inventors: Hisashi Saito, Shizuoka (JP); Hideharu Yamamoto, Fujinomiya (JP); Shinya Mochiyama, Fuji (JP); Atsushi Maeda, Fujinomiya (JP)

(73) Assignee: JATCO LTD, Fuji-Shi (JP)

( * ) Notice: Subject to any disclaimer, the term of this patent is extended or adjusted under 35 U.S.C. 154(b) by 157 days.

(21) Appl. No.: 14/433,567

(22) PCT Filed: Sep. 17, 2013

(86) PCT No.: PCT/JP2013/074961
§ 371 (c)(1),
(2) Date: Apr. 3, 2015

(87) PCT Pub. No.: WO2014/054411
PCT Pub. Date: Apr. 10, 2014

(65) Prior Publication Data
US 2015/0260237 A1 Sep. 17, 2015

(30) Foreign Application Priority Data
Oct. 4, 2012 (JP) .................................. 2012-222553

(51) Int. Cl.
*F16D 21/00* (2006.01)
*F16D 25/12* (2006.01)
(Continued)

(52) U.S. Cl.
CPC ........... *F16D 25/123* (2013.01); *F16D 13/74* (2013.01); *F16D 25/0638* (2013.01); *F16D 25/10* (2013.01)

(58) Field of Classification Search
CPC .... F16D 25/123; F16D 13/74; F16D 25/0638; F16D 25/10
See application file for complete search history.

(56) References Cited

U.S. PATENT DOCUMENTS

| 4,759,432 A | 7/1988 | Jurgens et al. |
| 6,609,439 B1 * | 8/2003 | Yamaguchi ......... F16D 25/0638 74/606 R |

(Continued)

FOREIGN PATENT DOCUMENTS

| EP | 1 923 590 A2 | 5/2008 |
| JP | S48-34226 U | 4/1973 |

(Continued)

*Primary Examiner* — David J Hlavka
(74) *Attorney, Agent, or Firm* — Foley & Lardner LLP

(57) ABSTRACT

A friction engagement element (CLx) is provided radially outside of a peripheral wall portion (32) of a clutch drum (30) and configured to be engaged by a piston (40). A piston (70) is provided radially inside of the peripheral wall portion (32) and configured to engage and a friction engagement element (CLz). A first peripheral wall portion (321) of the peripheral wall portion (32) includes through-holes (321a) communicating a radially inside of the first peripheral wall portion (321) with a radially outside thereof. A through-hole (87) is provided radially inside of the piston (70). The piston (70) includes a communication passage (79) radially passing through the piston (70) and communicating the through-hole (87) with the through-holes (321a) such that lubricating oil is supplied through the communication passage (79) and the through-holes (321a) to the radially outside of the clutch drum (30) when the piston (70) is in an initial position.

5 Claims, 5 Drawing Sheets

(51) Int. Cl.
*F16D 25/10* (2006.01)
*F16D 25/0638* (2006.01)
*F16D 13/74* (2006.01)

(56) References Cited

U.S. PATENT DOCUMENTS

| | | | |
|---|---|---|---|
| 2005/0067251 A1* | 3/2005 | Braford, Jr. | F16D 21/06 192/70.12 |
| 2008/0047799 A1* | 2/2008 | Combes | B60K 6/387 192/58.5 |
| 2008/0108468 A1 | 5/2008 | Iwasaki et al. | |
| 2009/0008212 A1* | 1/2009 | Combes | B60K 6/387 192/113.34 |
| 2009/0011892 A1 | 1/2009 | Nishida et al. | |
| 2009/0223769 A1* | 9/2009 | Nohl | F16D 21/06 192/48.8 |
| 2010/0072015 A1* | 3/2010 | Toyota | F16D 25/0638 192/3.33 |
| 2011/0073434 A1* | 3/2011 | Gold | F16D 25/0638 192/85.01 |
| 2011/0214959 A1 | 9/2011 | Fukaya et al. | |
| 2012/0118695 A1 | 5/2012 | Kawashima et al. | |
| 2012/0132022 A1 | 5/2012 | Fronius et al. | |

FOREIGN PATENT DOCUMENTS

| | | |
|---|---|---|
| JP | H11-344049 A | 12/1999 |
| JP | 2001-116121 A | 4/2001 |
| JP | 2001-349342 A | 12/2001 |
| JP | 2003-130085 A | 5/2003 |
| JP | 3124493 U | 8/2006 |
| JP | 2006-300266 A | 11/2006 |
| JP | 2008-014368 A | 1/2008 |
| JP | 2008-116015 A | 5/2008 |
| JP | 2008-539370 | 11/2008 |
| JP | 2011-179655 A | 9/2011 |

* cited by examiner

LUBRICATING STRUCTURE FOR FRICTION ENGAGEMENT ELEMENT OF AUTOMATIC TRANSMISSION

TECHNICAL FIELD

The present invention relates to a lubricating structure for friction engagement element of an automatic transmission.

BACKGROUND ART

In an automatic transmission for a vehicle in which a desired transmission ratio is attained by changing the combination of engagements/disengagements among a plurality of friction engagement elements, the respective friction engagement elements provided in a transmission case are lubricated by lubricating oil supplied from an oil pump.

The respective friction engagement elements are arranged along an input shaft and an output shaft which are provided coaxially to each other, in the transmission case. Lubricating oil derived from the oil pump flows in the input and output shafts in an axial direction, and then is discharged in a radially outer direction from oil holes formed in the input and output shafts. Thus, the corresponding friction engagement elements are lubricated.

As a basic configuration of the friction engagement element, radially-inner friction plates and radially-outer friction plates are disposed alternately in the axial direction. The friction engagement elements provided in the transmission case include a friction engagement element whose radially-inner friction plates are supported by an outer circumference of a cylindrical wall portion of a rotor (such as a drum).

In the case of such a friction engagement element, lubricating oil discharged from the oil holes blocked by the cylindrical wall portion from flowing in the radially outer direction in the transmission case. Hence, there is a risk that the friction engagement element located outside of the wall portion is deficiently lubricated.

Therefore, it is conceivable that the wall portion is formed with a communication hole which communicates a radially inner side of the wall portion with a radially outer side of the wall portion. However, in the case that the other member such as a piston configured to press the other friction engagement element is provided radially inside of the wall portion, there is a possibility that the friction engagement element located outside of the wall portion is insufficiently lubricated.

Patent Literature 1 discloses that a piston for pressing a friction engagement element provided outside of the wall portion in an axial direction is provided with a disc portion which extends in a radially inner direction to bypass the wall portion. From an oil passage formed continuously in the disc portion and the piston, lubricating oil is supplied to the friction engagement element located outside of the wall portion.

However, if the disc portion which extends in the radially inner direction to bypass the wall portion is unable to be provided, the friction engagement element located outside of the wall portion is unable to be sufficiently lubricated.

CITATION LIST

Patent Literature

Patent Literature 1: Japanese Patent Application Publication No. 2006-300266

SUMMARY OF THE INVENTION

It is required that the friction engagement element is sufficiently lubricated, even in the case that the friction engagement element is located outside of the cylindrical wall portion while the other structural components of the automatic transmission are located inside of the cylindrical wall portion. Therefore, it is an object of the present invention to provide a lubricating structure devised to respond to such a requirement.

According to the present invention, there is provided a lubricating structure for a friction engagement element of an automatic transmission, the lubricating structure comprising: a first friction engagement element provided radially outside of a tubular wall extending in an axial direction in a transmission case of the automatic transmission, and configured to be engaged and released by a first piston configured to move forward and backward in the axial direction; and a second piston provided radially inside of the tubular wall, configured to move forward and backward in the axial direction, and configured to engage and release a second friction engagement element, wherein the tubular wall includes a communication hole communicating a radially inside of the tubular wall with a radially outside of the tubular wall, a feed port is provided for lubricating oil and located radially inside of the second piston, and the second piston includes a communication passage radially passing through the second piston and communicating the feed port with the communication hole such that lubricating oil is supplied from the communication hole to the radially outside of the tubular wall when the second piston is in an initial position in which the second friction engagement element is in a released state.

Accordingly, when the second piston is in the initial position in which the second friction engagement element is in the released state, a large quantity of lubricating oil is supplied from the communication hole to the radially outside of the tubular wall. Hence, the first friction engagement element located radially outside of the tubular wall can be reliably lubricated.

DETAILED EXPLANATION OF THE INVENTION

Hereinafter, embodiments according to the present invention will be explained in detail.

Figure 1:
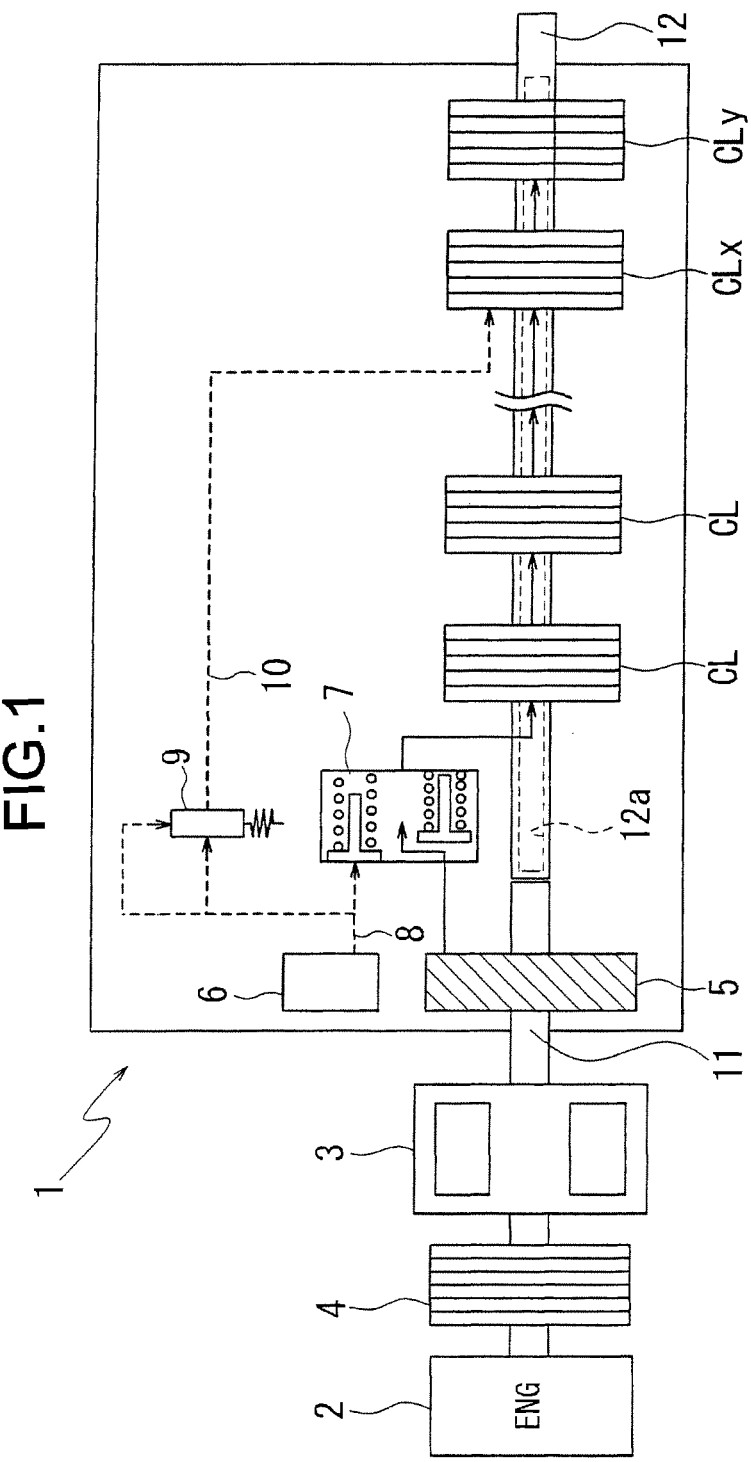
FIG. 1 A schematic configuration diagram of a vehicle equipped with an automatic transmission, to which a lubricating structure for friction engagement element is applied in an embodiment according to the present invention.

FIG. 1 is a schematic configuration diagram of a vehicle equipped with an automatic transmission 1, to which a lubricating structure for a friction engagement element in an embodiment according to the present invention is applied.

The vehicle equipped with the automatic transmission 1 to which the lubricating structure according to this embodiment is applied includes a clutch 4 provided between an engine 2 and a motor 3. The clutch 4 connects and disconnects the engine 2 with/from the motor 3. As a result, at least one of a rotational drive force of the engine 2 and a rotational drive force of the motor 3 is inputted into the automatic transmission 1. The automatic transmission 1 is disposed at a stage posterior to (i.e. disposed at a rear stage of) the motor 3.

The automatic transmission 1 includes a plurality of friction engagement elements (clutches) CL inside a transmission case. The automatic transmission 1 realizes a desired transmission ratio by changing a combination of engagements/disengagements among the plurality of friction engagement elements. Accordingly, the automatic transmission 1 changes a rotational speed of the inputted rotational drive force at a speed ratio determined by the realized transmission ratio, and then outputs this rotational drive force through an output shaft 12 to drive road-wheels (not shown).

The automatic transmission 1 includes a mechanically-driven oil pump (hereinafter referred to as mechanical oil pump) 5 which is driven by the engine, and an electrically-powered oil pump (electric oil pump) 6 which is driven by a battery. An operation/non-operation of the electric oil pump 6 is controlled according to a driving state of the vehicle, by a control device (not shown) for the automatic transmission 1.

Working oil which is fed by the mechanical oil pump 5 and the electric oil pump 6 is supplied through a changeover valve 7 to a hydraulic control apparatus (not shown). When a pressure of working oil fed by the mechanical oil pump 5 is higher than a predetermined pressure, the changeover valve 7 supplies the working oil derived from the mechanical oil pump 5, to the hydraulic control apparatus. On the other hand, when the pressure of working oil fed by the mechanical oil pump 5 is lower than the predetermined pressure, the changeover valve 7 supplies the working oil derived from the electric oil pump 6, to the hydraulic control apparatus.

The working oil supplied to the hydraulic control apparatus is used for engaging and lubricating the friction engagement elements CL, CLx and CLy of the automatic transmission 1.

A pipe 8 which connects the electric oil pump 6 with the changeover valve 7 is connected with a branch pipe 10 equipped with a relief valve 9. The working oil derived from the electric oil pump 6 is used for lubricating the friction engagement element CLx, when the changeover valve 7 supplies the working oil derived from the mechanical oil pump 5, to the hydraulic control apparatus. That is, while the working oil derived from the mechanical oil pump 5 is supplied to the hydraulic control apparatus, the working oil derived from the electric oil pump 6 is supplied through the branch pipe 10 to the friction engagement element CLx located at a posterior stage (rear stage) in the transmission case.

In the transmission case of the automatic transmission 1, an input shaft 11 is arranged coaxially to the output shaft 12. Moreover, in the transmission case, the friction engagement elements CL and structural components of a shift mechanism section of the automatic transmission 1 are provided along an axial direction of the input shaft 11 and the output shaft 12.

An oil passage 12a in which working oil (lubricating oil) flows is formed inside the output shaft 12 such that the oil passage 12a extends in a longitudinal direction of the output shaft 12. Working oil flows in the oil passage 12a of the output shaft 12, and then is discharged out from the oil passage 12a in a radially outer direction of the output shaft 12 through oil holes formed in the output shaft 12. Accordingly, the discharged working oil lubricates the friction engagement elements CL and the like located radially outside of the output shaft 12.

In the case of the automatic transmission 1 according to this embodiment, the working oil supplied from the branch pipe 10 is used for lubricating the friction engagement element CLx which is the furthest away from the mechanical oil pump 5. It is noted that the friction engagement elements CLx and CLy are provided at the furthest location from the mechanical oil pump 5 (among the plurality of friction engagement elements) with respect to the axial direction of the output shaft 12. The friction engagement elements CLx and CLy are engaged when the vehicle starts moving. That is, one of the friction engagement elements CLx and CLy is engaged when the vehicle starts moving forward, whereas another of the friction engagement elements CLx and CLy is engaged when the vehicle starts moving backward.

Figure 2:
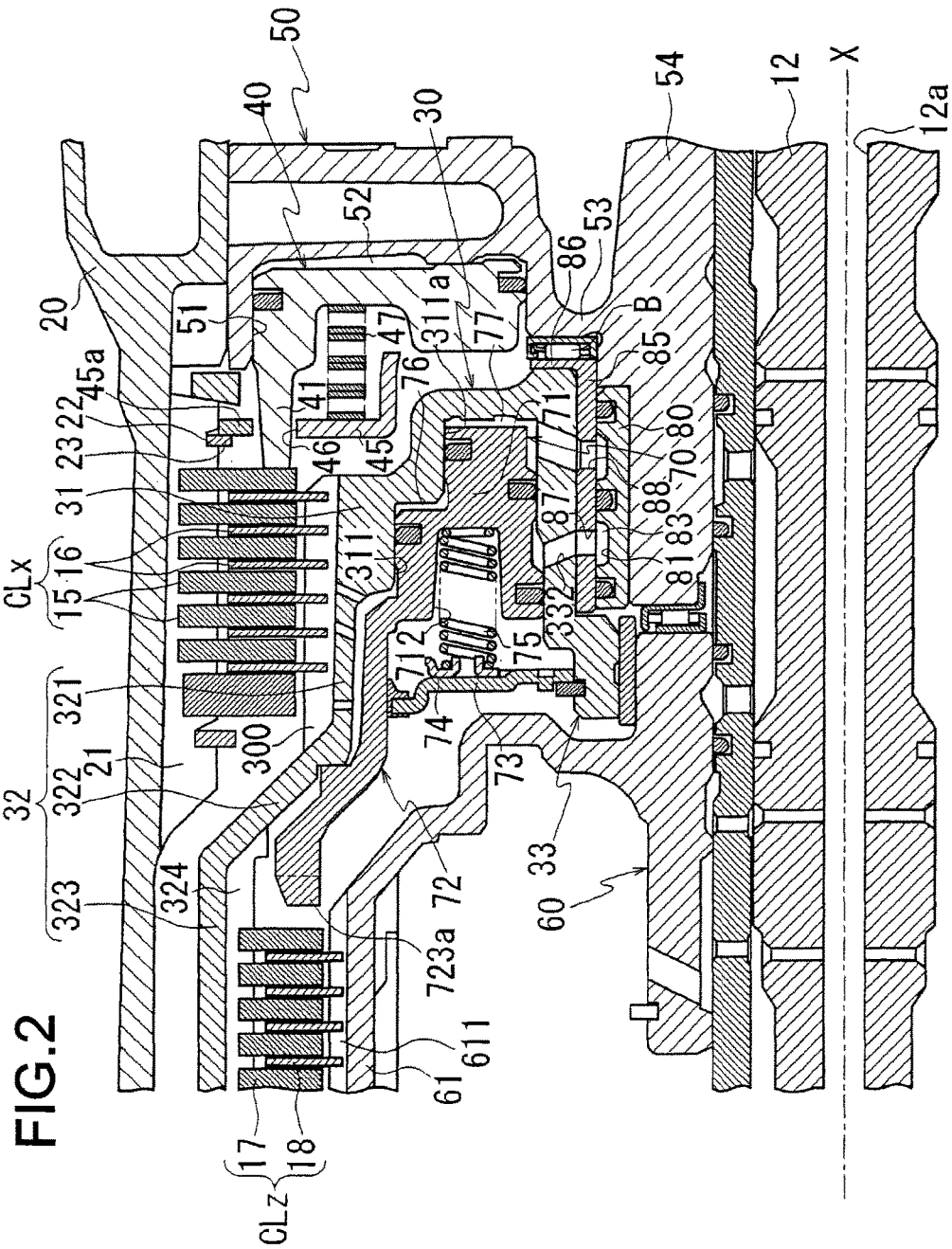
FIG. 2 An explanatory view of the lubricating structure for friction engagement element in the embodiment.

FIG. 2 is an explanatory view of a lubricating structure for the friction engagement element CLx provided on a posterior portion (rear side) of the output shaft 12.

In the case of the automatic transmission 1 according to this embodiment, the friction engagement element CLx is located radially outside of a clutch drum 30. The clutch drum 30 includes a peripheral wall portion 32 which extends in the axial direction inside the transmission case 20. Lubricating oil supplied from the output shaft 12 (i.e. from a radially inner side) is inhibited by the peripheral wall portion 32 from moving in a radially outer direction. Hence, it is difficult to lubricate the friction engagement element CLx.

Therefore, in order to lubricate the friction engagement element CLx, the lubricating structure is provided in a posterior (rear) region of the automatic transmission 1.

The lubricating structure provided in the posterior region of the automatic transmission 1 will now be explained.

As shown in FIG. 2, splines 21 are formed in an inner circumference of the transmission case 20 near a rear cover (not shown) which closes and seals a rear opening of the transmission case 20. An outer circumference of the clutch drum 30 faces a radially inner side of each spline 21. Splines 300 are provided on the outer circumference of the clutch drum 30, and face the radially inner side of the splines 21.

A plurality of outer friction plates 15 caught by the splines 21 and a plurality of inner friction plates 16 caught by the splines 300 are disposed radially outside of the clutch drum 30 such that alternating layers of the outer friction plates 15 and the inner friction plates 16 are formed in the axial direction. The friction engagement element CLx is constituted by the plurality of outer friction plates 15 and the plurality of inner friction plates 16.

A piston 40 for pressing the friction engagement element CLx in the axial direction is provided on the right side of the friction engagement element CLx in FIG. 2 (in a rearward side in the transmission case 20). A partition wall 50 fixed to the transmission case 20 includes a ring-shaped cylinder 51. The piston 40 is able to move forward and backward in the axial direction, inside the cylinder 51. An oil chamber 52 is formed between the piston 40 and the cylinder 51.

The piston 40 is in the form of a ring corresponding to the shape of the cylinder 51. The piston 40 includes pressing portions 41 formed near an outer circumferential edge of the piston 40. The pressing portions 41 are formed at even intervals along the circumferential direction of the piston 9, and extend in the axial direction toward the friction engagement element CLx. These pressing portions 41 are located to axially overlap with (i.e. are matched with) through-holes 46 of a spring retainer 45. The number of the pressing portions 41 is equal to the number of the through-holes 46.

The spring retainer 45 is provided between the friction engagement element CLx and the cylinder 51. Moreover, a wave spring 47 is provided between the piston 40 and the spring retainer 45, and biases the piston 40 in a direction away from the friction engagement element CLx.

An outer circumferential edge 45a of the spring retainer 45 is latched such that a surface of the outer circumferential edge 45a which faces the friction engagement element CLx is stopped by a snap ring 23 fitted into a groove 22 of the spline 21. Accordingly, an axial positioning of the spring retainer 45 is given by the snap ring 23.

The clutch drum 30 includes a base portion 31 and the peripheral wall portion 32. The base portion 31 is formed in a ring shape as viewed in the axial direction. The peripheral wall portion 32 extends from an outer circumference of the base portion 31 in a direction opposite to (i.e., a direction away from) the piston 40. Hence, the clutch drum 30 is in the form of a cylinder having its bottom.

The peripheral wall portion 32 includes a first peripheral wall portion 321, a second peripheral wall portion 322 and a third peripheral wall portion 323. The first peripheral wall portion 321 is formed over an entire periphery of the clutch drum 30, i.e. is formed to be continuous with whole of an outer circumferential edge of the base portion 31. The second peripheral wall portion 322 has a diameter which is gradually enlarged with increasing distance from the first peripheral wall portion 321. The third peripheral wall portion 323 has a diameter larger than a diameter of the first peripheral wall portion 321.

The first peripheral wall portion 321 extends in parallel with an axis (center line) X of the output shaft 12. In the outer circumference of the base portion 31 and an outer circumference of the first peripheral wall portion 321, above-mentioned each spline 300 is arranged along the axial direction.

The plurality of splines 300 are provided at circumferentially predetermined intervals with respect to the axis X. The above-mentioned inner friction plates 16 of the friction engagement element CLx are caught by the plurality of splines 300.

Each of the splines 300 is formed over a range from the outer circumference of the base portion 31 through the outer circumference of the first peripheral wall portion 321 to a part of an outer circumference of the second peripheral wall portion 322 which is near the first peripheral wall portion 321. Each of the splines 300 extends in parallel with the axis X.

The third peripheral wall portion 323 extends from a tip of the second peripheral wall portion 322 in parallel with the axis X. Splines 324 each extending in the axial direction are formed in an inner circumference of the third peripheral wall portion 323. The plurality of splines 324 are provided at circumferentially predetermined intervals with respect to the axis X. Outer friction plates 17 of the other friction engagement element CLz adjacent to the friction engagement element CLx are caught by the plurality of splines 324.

A hub portion 61 whose outer circumference includes splines 611 is located radially inside of the third peripheral wall portion 323. The hub portion 61 extends from a rotary member 60. (A main part of) The rotary member 60 is located radially inside of the hub portion 61. Inner friction plates 18 caught by the splines 611 of the hub portion 61 and the outer friction plates 17 caught by the splines 324 of the third peripheral wall portion 323 are disposed to form alternating layers of the inner friction plates 18 and the outer friction plates 17 in the axial direction. The friction engagement element CLz is constituted by these inner friction plates 18 and outer friction plates 17.

A piston 70 for pressing the friction engagement element CLz in the axial direction is provided on the right side of the friction engagement element CLz in FIG. 2 (in a rearward side in the transmission case 20). The piston 70 is able to move forward and backward in the axial direction, inside a ring-shaped cylinder 311. This ring-shaped cylinder 311 is formed in the base portion 31 of the clutch drum 30. Oil chambers 76 and 77 are formed between the piston 70 and the cylinder 311.

The piston 70 is in the form of a ring corresponding to the shape of the cylinder 311. The piston 70 includes a ring-shaped arm portion 72 formed at an outer circumferential edge of a base portion 71 of the piston 70. The arm portion 72 extends in the axial direction toward the friction engagement element CLz.

Figure 3:
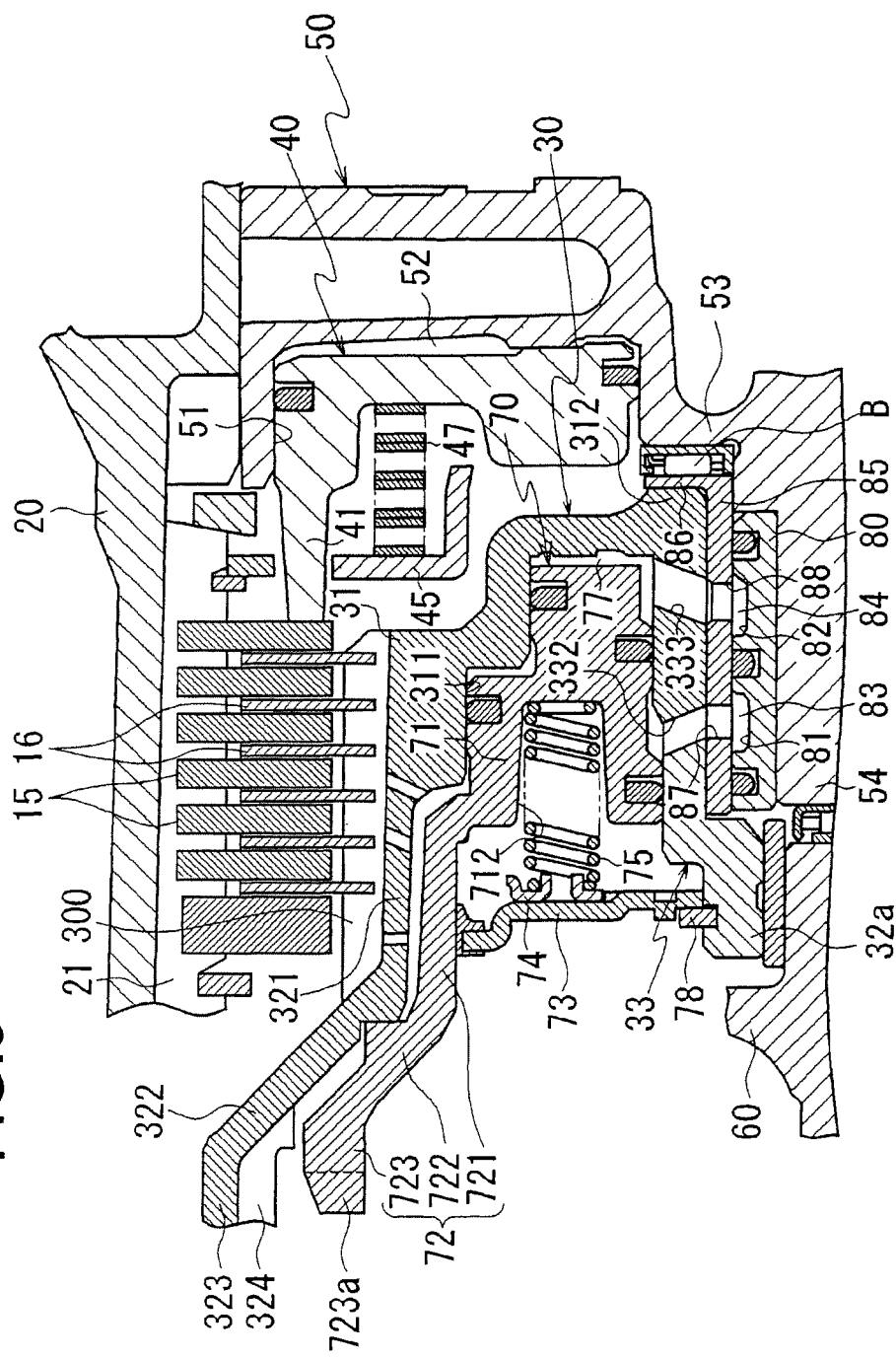
FIG. 3 An enlarged view of a main part of the lubricating structure for friction engagement element in the embodiment.
Figure 4:
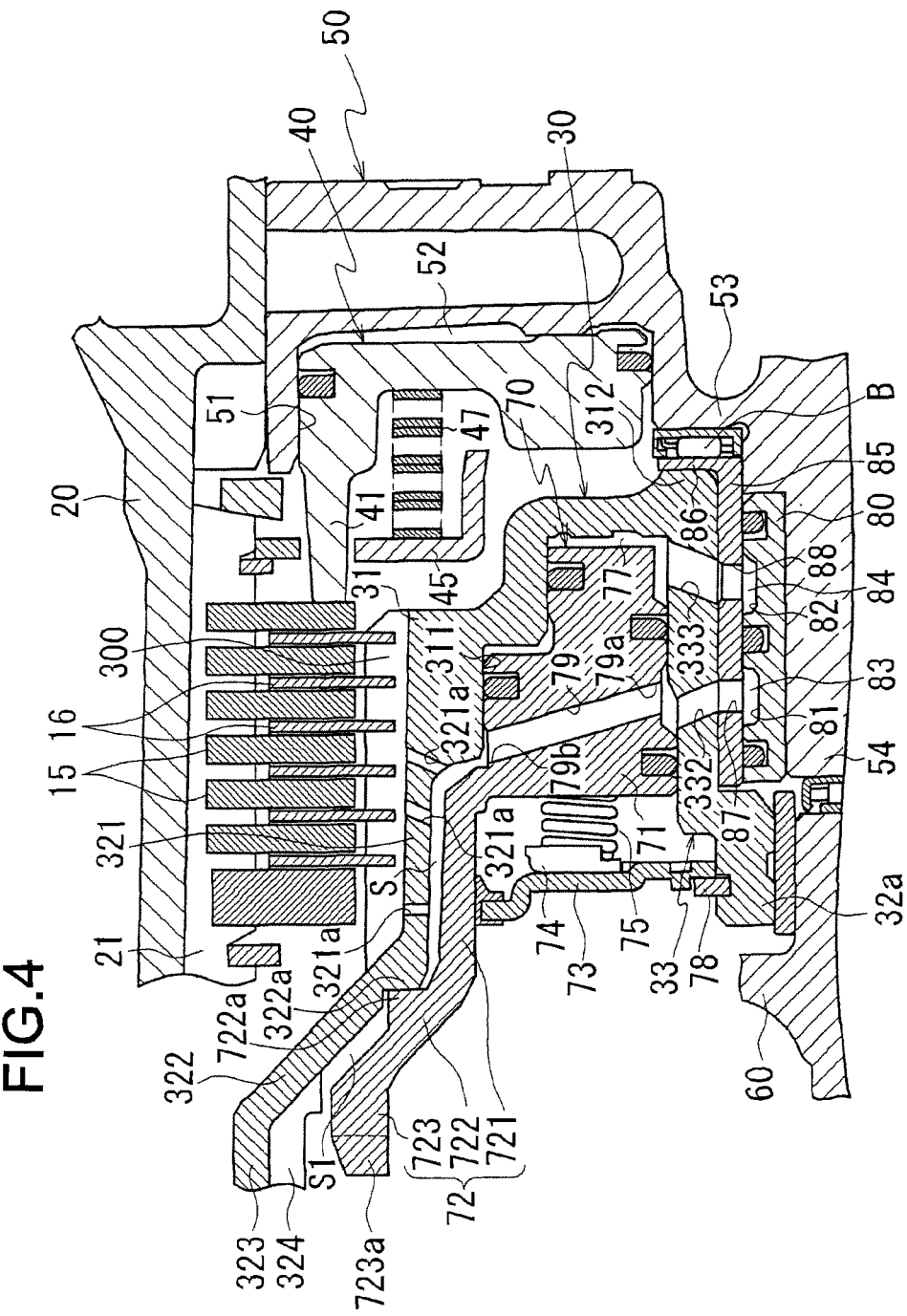
FIG. 4 An enlarged view of the main part of the lubricating structure for friction engagement element in the embodiment.
Figure 5:
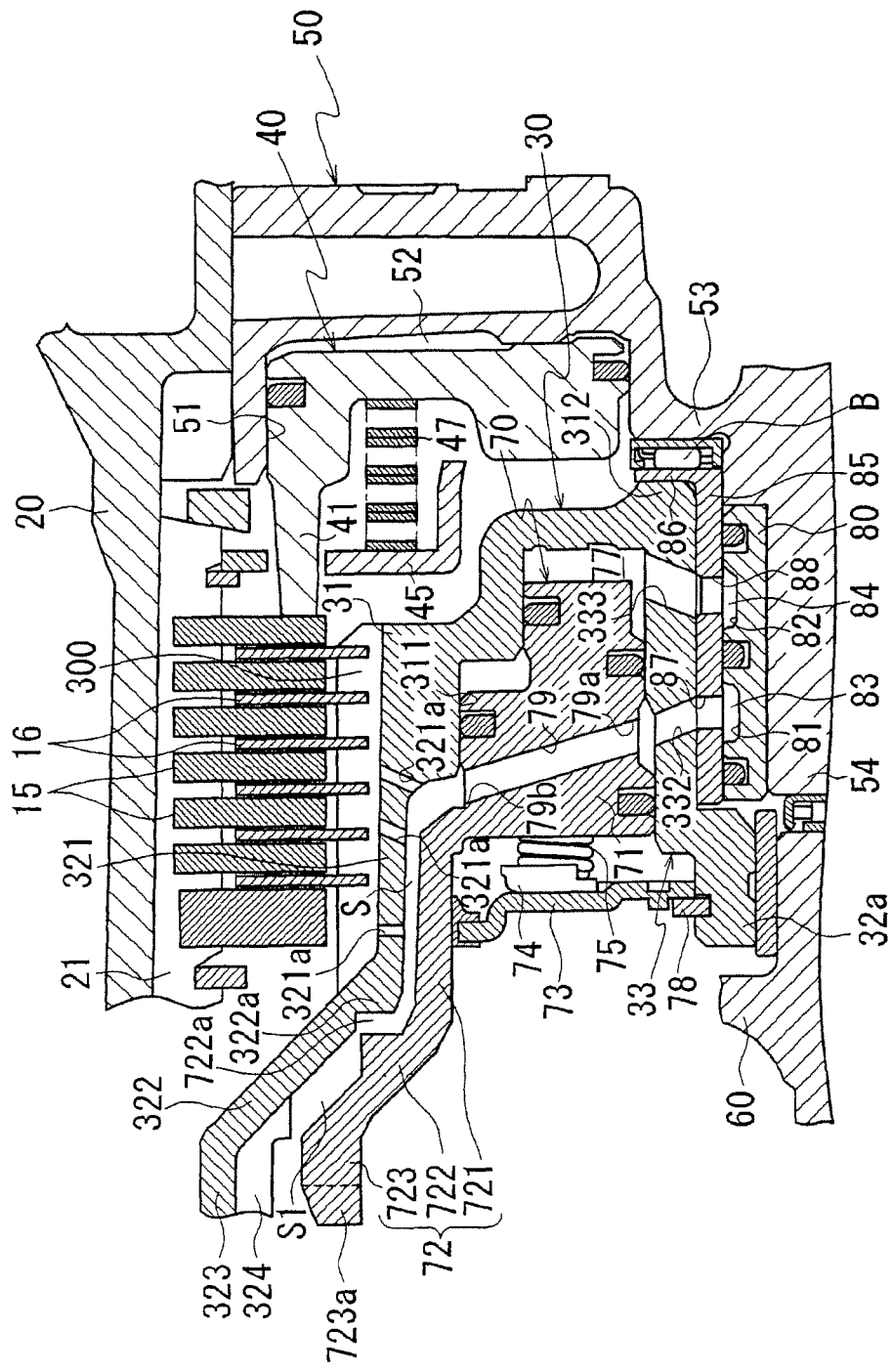
FIG. 5 An enlarged view of the main part of the lubricating structure for friction engagement element in the embodiment.

FIG. 3 is an enlarged view of FIG. 2 around the piston 70. In detail, FIG. 3 is a sectional view obtained by a cutting plane passing through a spring-retention hole 712 of the piston 70. FIG. 4 is a sectional view obtained by a cutting plane passing through a communication passage 79 of the piston 70, and explains the case that the piston 70 is located in its unactuated position. FIG. 5 is a sectional view obtained by a cutting plane passing through the communication passage 79 of the piston 70, and explains the case that the piston 70 is located in its actuated position.

The arm portion 72 includes a tubular portion 721, a diameter-enlarged portion 722 and an annular portion 723. The tubular portion 721 extends in the axial direction along the first peripheral wall portion 321 of the clutch drum 30. The diameter-enlarged portion 722 extends from a tip of the tubular portion 721 in the radially outer direction. The annular portion 723 extends from a tip of the diameter-enlarged portion 722, along the third peripheral wall portion 323 of the clutch drum 30. The annular portion 723 includes a plurality of pressing portions 723a at a tip of the annular portion 723. The plurality of pressing portions 723a are formed at even intervals along a circumferential direction of the annular portion 723, and extend in the axial direction toward the friction engagement element CLz (see FIG. 2).

The plurality of spring-retention holes 712 are formed in a surface of the base portion 71 of the piston 70 which faces the friction engagement element CLz. One end portion of a return spring 75 is inserted into each of the spring-retention holes 712. The plurality of spring-retention holes 712 are provided at circumferentially even intervals with respect to the axis X (see FIG. 2).

Another end of the return spring 75 is supported by an attaching portion 74 of a spring retainer 73. The piston 70 is biased by the return springs 75 in a direction away from the friction engagement element CLz.

The spring retainer 73 is in the form of a ring as viewed in the axial direction. A radially inner portion of the spring retainer 73 is supported by a snap ring 78 provided in an internal cylinder portion 33 of the clutch drum 30. Accordingly, an axial positioning of the spring retainer 73 is given by the snap ring 78.

A boss portion 54 is located radially inward of the base portion 31 (the cylinder 311) of the clutch drum 30. The boss portion 54 extends in the axial direction from a radially inner portion of the partition wall 50 fixed to the transmission case 20. An inner tubular member 80 and an outer tubular member 85 are provided between the internal cylinder portion 33 and the boss portion 54. Concave grooves 81 and 82 are formed in an outer circumferential surface of the inner tubular member 80 such that an interval between the concave grooves 81 and 82 is kept in the axial direction. The outer tubular member 85 covers the grooves 81 and 82 of the inner tubular member 80 such that oil passages 83 and 84 are formed between the inner tubular member 80 and the outer tubular member 85.

One end of the outer tubular member 85 which is near the partition wall 50 includes a flange portion 86. The flange portion 86 extends in the radial direction. A surface of the flange portion 86 which faces the piston 70 is in contact with a contact portion 312 of a radially inner portion of the clutch drum 30. On the other hand, a surface of the flange portion 86 which faces the partition wall 50 abuts through a thrust bearing B on a shoulder portion 53 of the partition wall 50.

The concave groove 81 of the inner tubular member 80 is connected to the branch pipe 10 (see FIG. 1) through an oil passage (not shown) formed in the partition wall 50. It is noted that the branch pipe 10 is formed to go around (bypass) an opening (not shown) of the transmission case 20 which faces an oil pan. Hence, working oil fed through the branch pipe 10 and the relief valve 9 from the electric oil pump 6 is supplied to the oil passage 83 between the inner tubular member 80 and the outer tubular member 85, as lubricating oil.

The outer tubular member 85 is formed with through-holes 87 and 88 which radially pass through the outer tubular member 85. Locations of the through-holes 87 and 88 respectively correspond to the locations of the concave grooves 81 and 82. In detail, a plurality of through-holes 87 are formed at circumferentially some intervals with respect to the axis X, and a plurality of through-holes 88 are formed at circumferentially some intervals with respect to the axis X.

The concave groove 82 of the inner tubular member 80 is connected to the oil passage 12a of the output shaft 12 through an oil passage (not shown) formed in the partition wall 50. Working oil fed from the mechanical oil pump 5 is supplied to the oil passage 84 between the inner tubular member 80 and the outer tubular member 85.

The internal cylinder portion 33 of the clutch drum 30 which is located radially outside of the outer tubular member 85 is formed with through-holes 332 and 333 which radially pass through the internal cylinder portion 33. Locations of the through-holes 332 and 333 in an inner circumferential surface of the internal cylinder portion 33 correspond to the locations of the concave grooves 81 and 82.

Accordingly, lubricating oil fed from the electric oil pump 6 into the oil passage 83 is supplied through the through-hole 87 and the through-hole 332 into the cylinder 311 of the clutch drum 30, so that the piston 70 is lubricated.

Moreover, lubricating oil can be fed from the mechanical oil pump 5 to the oil passage 84 when the piston 70 is made to move to the actuated position shown in FIG. 5. The lubricating oil fed to the oil passage 84 is supplied through the through-hole 88 and the through-hole 333 to the oil chamber 77 of the piston 70, so that the piston 70 is moved toward the actuated position.

As mentioned above, the return springs 75 bias the piston 70 to keep the piston 70 in an initial position (the unactuated position) in which the friction engagement element CLz is in an uncompressed state. The plurality of return springs 75 are provided at circumferential intervals with respect to the axis X. Also, the plurality of spring-retention holes 712 for the return springs 75 are arranged at intervals along the circumferential direction of the base portion 71 of the piston 70 with respect to the axis X.

The base portion 71 of the piston 70 according to the embodiment is formed with communication passages 79 (see FIG. 4). Each of the communication passages 79 is located between adjacent two spring-retention holes 712 and 712 in the circumferential direction with respect to the axis X, and radially passes through the piston 70 (the base portion 71).

As shown in FIG. 4, an opening 79a of a radially inner portion of each communication passage 79 is continuous with (i.e. communicates with) the through-hole 332 of the internal cylinder portion 33 when the piston 70 is in the initial position (in the unactuated position).

Moreover, an opening 79b of a radially outer portion of each communication passage 79 is continuous with (i.e. communicates with) a space S between the peripheral wall portion 32 (the first peripheral wall portion 321) of the clutch drum 30 and the arm portion 72 (the tubular portion 721) when the piston 70 is in the initial position (in the unactuated position).

According to the embodiment, when the piston 70 is in the initial position (in the unactuated position), the space S is kept outside of the arm portion 72 (the tubular portion 721) of the piston 70, and inside of a portion of the clutch drum 30 ranging from the base portion 31 to the first peripheral wall portion 321. This space S is located on an extension of each communication passage 79 formed in the piston 70.

Hence, lubricating oil fed and moved inside the communication passages 79 from a radially inner side of the piston 70 in the radially outer direction is supplied to the space S between the arm portion 72 of the piston 70 and the clutch drum 30.

The first peripheral wall portion 321 of the clutch drum 30 is formed with a plurality of through-holes 321a which radially pass through the first peripheral wall portion 321. Each of the through-holes 321a is open to a region between the plurality of splines 300 provided in the outer circumference of the clutch drum 30.

Accordingly, when the piston 70 is in the initial position (in the unactuated position), lubricating oil fed from the radially inner side of the piston 70 through the communication passages 79 to the space S formed between the piston 70 and the clutch drum 30 is discharged from the through-holes 321a of the first peripheral wall portion 321 to a radially outside of the first peripheral wall portion 321. Thus, the friction engagement element CLx located radially outside of the first peripheral wall portion 321 is lubricated.

The diameter-enlarged portion 722 of the arm portion 72 of the piston 70 includes a protruding portion 722a which protrudes in the radially outer direction. The second peripheral wall portion 322 of the clutch drum 30 includes a contact portion 322a which protrudes in the radially inner direction at a location corresponding to the protruding portion 722a of the arm portion 72.

When the piston 70 moves up to the initial position (to the unactuated position), the protruding portion 722a becomes in contact with the contact portion 322a in the axial direction of the axis X so that a radially outer portion (tip portion) of the space S between the arm portion 72 and the peripheral wall portion 32 is sealed.

Accordingly, when the piston 70 is in the initial position (in the unactuated position), the tip portion of the space S is sealed by the protruding portion 722a and the contact portion 322a such that lubricating oil supplied through the communication passages 79 of the piston 70 into the space S is not discharged to a space S1 formed on the left side of the space S in Figures, i.e. formed near the friction engagement element CLz.

Thus, lubricating oil supplied into the space S is reliably discharged through the through-holes 321*a* toward the radially outside of the first peripheral wall portion 321. As a result, the friction engagement element CLx located radially outside of the first peripheral wall portion 321 is reliably lubricated.

As shown in FIG. 5, when the piston 70 moves to the actuated position, the protruding portion 722*a* of the arm portion 72 gets away from the contact portion 322*a* of the peripheral wall portion 32 (the first peripheral wall portion 321). Thereby, the seal of the tip portion (left-side portion in Figures) of the space S is released, so that lubricating oil supplied through the communication passages 79 of the piston 70 into the space S is discharged also to the space S1 which faces the friction engagement element CLz (on the left side in Figures). At this time, although the lubricating oil supplied into the space S is discharged also to the radially outside of the first peripheral wall portion 321 through the through-holes 321*a*, the lubricating oil is discharged into the space 51 by a greater quantity than a quantity that is discharged to the radially outside of the first peripheral wall portion 321. This is because the space S1 is located in a flowing direction of the lubricating oil introduced into the space S.

Therefore, when the piston 70 is in the initial position (in the unactuated position), the friction engagement element CLx located radially outside of the first peripheral wall portion 321 can be aggressively lubricated.

According to the embodiment, a lubricating structure for friction engagement element of an automatic transmission includes: the friction engagement element CLx provided radially outside of a portion of the clutch drum 30 ranging from the base portion 31 to the tubular peripheral wall portion 32 and configured to be engaged and released by the piston 40 configured to move forward and backward in the direction of the axis X in the transmission case 20 of the automatic transmission 1; and the piston 70 provided radially inside of the portion of the clutch drum 30 and configured to move forward and backward in the axial direction to engage and release the friction engagement element CLz in the transmission case 20. Moreover, the first peripheral wall portion 321 of the peripheral wall portion 32 includes the plurality of through-holes 321*a* communicating the radially inside of the first peripheral wall portion 321 with the radially outside of the first peripheral wall portion 321. Moreover, the through-hole 87 is provided radially inside of the piston 70 as a feed port for lubricating oil. Moreover, the piston 70 includes a communication passage 79 radially passing through the piston 70 in a linear fashion and communicating the through-hole 87 with the through-holes 321*a* such that lubricating oil is supplied through the communication passage 79 and the through-holes 321*a* to the radially outside of the clutch drum 30 when the piston 70 is in the initial position in which the friction engagement element CLz is in a released state.

Accordingly, when the second piston is in the initial position in which the second friction engagement element is in the released state, a larger quantity of lubricating oil is supplied from the communication hole to the radially outside of the tubular wall. Hence, the first friction engagement element located radially outside of the tubular wall is able to be reliably lubricated.

Moreover, according to the embodiment, the friction engagement element CLx and the friction engagement element CLz are designed not to be in an engaged state at the same time. That is, the friction engagement element CLz is in the unengaged state when the friction engagement element CLx is in the engaged state.

By such a configuration, lubricating oil fed from the radially inside of the piston 70 is supplied to the radially outside of the first peripheral wall portion 321 when the piston 40 presses the friction engagement element CLx (i.e. over a range from a time at which the piston 40 starts compressing the friction engagement element CLx to a time at which the piston 40 finishes compressing the friction engagement element CLx). Hence, the friction engagement element CLx located radially outside of the first peripheral wall portion 321 can be certainly lubricated.

A heat generated in the friction engagement element CLx takes its peak when the friction engagement element CLx is made to be compressed (i.e. when the inner friction to plates 16 and the outer friction plates 15 rotate in a slipping state relative to each other). At this time (when the generated heat takes its peak), lubricating oil is supplied to the friction engagement element CLx. Therefore, heat generation of the friction engagement element CLx is suppressed, so that a reduction of durability due to heat generation of the friction engagement element CLx can be suppressed.

Moreover, even if it is impossible that the piston 40 is formed with a disc portion which extends in the radially inner direction to bypass the clutch drum 30 such that lubricating oil is supplied to the friction engagement element CLx through an oil passage formed in the disc portion, the friction engagement element CLx can be reliably lubricated.

Particularly, when the friction engagement element CLz is in the unengaged state, the piston 70 is located in the initial position and does not move in the axial direction. Hence, at this time, the communication between the through-holes 321*a* and the through-hole 87 is certainly secured (kept) by the communication passage 79. Accordingly, the friction engagement element CLx located radially outside of (the first peripheral wall portion 321 of) the clutch drum 30 can be reliably lubricated.

On the other hand, when the piston 70 engages the friction engagement element CLz, the piston 70 moves forward and backward in the axial direction in accordance with the biasing force of the return spring 75 and the working oil pressures of the oil chambers 76 and 77. Hence, the position of (the communication passage 79 of) the piston 70 is not stable in the axial direction.

Hence, there is a possibility that the friction engagement element CLx located radially outside of (the first peripheral wall portion 321 of) the clutch drum 30 is insufficiently lubricated.

In the embodiment, the communication passage 79 of the piston 70 is provided at a location that communicates (connects) the through-holes 321*a* with the through-hole 87 when the piston 70 is in the unactuated state and does not move in the axial direction. Hence, in this state, the friction engagement element CLx located radially outside of (the first peripheral wall portion 321 of) the clutch drum 30 is reliably lubricated.

According to the embodiment, the return spring 75 is provided for biasing the piston 70 toward the initial position.

Moreover, the base portion 71 of the piston 70 includes the plurality of spring-retention holes 712 formed at the predetermined intervals along the circumferential direction of the base portion 71 with respect to the axis X, and each of the plurality of spring-retention holes 712 retains one end portion of the coil-shaped return spring 75.

Moreover, each communication passage 79 passes between circumferentially adjacent two of the plurality of spring-retention holes 712 with respect to the axis X as viewed in the axial direction, and thereby radially passes through the base portion 71 in a linear fashion.

By such a configuration, a thick portion between two spring-retention holes 712 in the base portion 71 of the piston 70 is utilized so that the communication passage 79 can be provided in the linear fashion. Hence, each communication passage 79 in the piston 70 can be formed to have the shortest whole length, without complicating the shape of the communication passage 79. Accordingly, a quantity of lubricating oil which stays in the communication passages 79 can be suppressed even if a quantity of the supplied lubricating oil becomes small. Therefore, the insufficient lubrication of the friction engagement element which is located radially outside of the clutch drum 30 is avoided.

According to the embodiment, one end of the peripheral wall portion 32 of the clutch drum 30 provided in the form of a cylinder having its bottom is sealed. Moreover, the piston 70 includes the arm portion 72 which is located radially inside of the peripheral wall portion 32 and which extends along the peripheral wall portion 32 toward another end of the peripheral wall portion 32 (i.e. toward the friction engagement element CLz) to set the space S between the peripheral wall portion 32 and the arm portion 72.

Moreover, an outer circumferential portion of the arm portion 72 includes the protruding portion 722a which protrudes in the radially outer direction and which is formed over an entire circumference of the arm portion 72.

Moreover, an inner circumferential portion of the peripheral wall portion 32 includes the contact portion 322a which protrudes in the radially inner direction and which is formed over an entire circumference of the peripheral wall portion 32. Thereby, the protruding portion 722a of the arm portion 72 becomes in contact with the contact portion 322a in the axial direction when the piston 70 moves to the unactuated position (initial position).

Thus, the space S formed between the arm portion 72 and the peripheral wall portion 32 is sealed at a portion of the space S which is near the friction engagement element CLz, when the piston 70 is in the unactuated position. On the other hand, the space S is communicated with the space S1 located on the friction engagement element CLz when the piston 70 is in the actuated position.

By such a configuration, the friction-engagement-element-CLz-side portion of the pace S is sealed by the protruding portion 722a and the contact portion 322a when the piston 70 is in the initial position (unactuated position). As a result, lubricating oil supplied through the communication passage 79 of the piston 70 into the space S is not discharged toward the friction engagement element CLz (located on the left side in Figures).

Accordingly, lubricating oil supplied into the space S is certainly discharged through the through-holes 321a to the radially outside of the first peripheral wall portion 321. Hence, the friction engagement element CLx located radially outside of the first peripheral wall portion 321 is reliably lubricated.

According to the embodiment, the automatic transmission 1 attains a desired transmission ratio by changing the combination of engagements and releases among the plurality of friction engagement elements provided coaxially to one another. The automatic transmission 1 includes the electric oil pump 6, in addition to the mechanical oil pump 5 that is driven by the engine. The friction engagement element CLx is provided at the most distant location from the mechanical oil pump 5 in the axial direction, and located outside of the tubular peripheral wall portion 32 of the clutch drum 30. The through-hole 87 which functions as the feed port for lubricating oil receives lubricating oil directly supplied from the electric oil pump 6.

Generally, as the friction engagement element becomes more distant (further away) from the mechanical oil pump 5, it becomes more difficult to supply lubricating oil from the mechanical oil pump 5 to the friction engagement element, so that the insufficient lubrication is caused. In particular, in the case that the friction engagement element is located outside of a tubular wall (such as the first peripheral wall portion 321 of the clutch drum 30) which extends in the axial direction, the friction engagement element tends to be lubricated more insufficiently.

Therefore, in the embodiment, the through-hole 87 receives lubricating oil directly from the electric oil pump 6, but not from the mechanical oil pump 5. Hence, a sufficient quantity of lubricating oil is obtained so that the friction engagement element CLx provided at the most distant location from the mechanical oil pump 5 can be sufficiently lubricated.

According to the embodiment, the automatic transmission 1 includes the changeover valve 7 which selectively outputs one of working oil derived from the mechanical oil pump 5 and working oil derived from the electric oil pump 6, in accordance with the pressure of working oil derived from the mechanical oil pump 5. When the changeover valve 7 outputs the working oil derived from the mechanical oil pump 5, the working oil derived from the electric oil pump 6 is supplied to the friction engagement element CLx.

In conventional techniques, the working oil derived from the electric oil pump 6 is drained (not used) from the relief valve 9, when the changeover valve 7 outputs the working oil derived from the mechanical oil pump 5, as a working oil for engaging or lubricating the friction engagement elements. In the embodiment, the working oil (which is not used in conventional techniques) derived from the electric oil pump 6 is used to lubricate the friction engagement element which is the furthest away from the mechanical oil pump 5 and which is difficult to lubricate. Hence, such a friction engagement element is reliably lubricated. In particular, because the working oil which is not used in conventional techniques is used, the friction engagement element located the furthest away from the mechanical oil pump 5 can be lubricated without providing a purpose-built extra pump or the like.

According to the embodiment, the inner tubular member 80 and the outer tubular member 85 are provided radially inside of the piston 70. The inner tubular member 80 includes the concave grooves 81 and 82 formed in an outer circumferential portion of the inner tubular member 80. The outer tubular member 85 covers the concave grooves 81 and 82 of the inner tubular member 80 such that the oil passages 83 and 84 for the working oil derived from the electric oil pump 6 are formed between the inner tubular member 80 and the outer tubular member 85. The outer tubular member 85 includes the plurality of through-holes 87 which are formed at intervals along the circumferential direction of the outer tubular member 85 and which radially pass through the outer tubular member 85.

By such a configuration, the through-holes 87 serve as feed ports through which lubricating oil is supplied to the radially inside of the piston 70. In advance, by preparing a plurality of outer tubular members 85 having different numbers of the communication passages 79 from one another, lubricating oil can be properly supplied to the communication passages 79 even if the number of the communication passages 79 formed in the base portion 31 of the clutch drum 30 is different.

The invention claimed is:

1. A lubricating structure for a friction engagement element of an automatic transmission, the lubricating structure comprising:
    a first friction engagement element provided radially outside of a tubular wall extending in an axial direction in a transmission case of the automatic transmission, and configured to be engaged and released by a first piston configured to move forward and backward in the axial direction; and
    a second piston provided radially inside of the tubular wall, configured to move forward and backward in the axial direction, and configured to engage and release a second friction engagement element,
    wherein the tubular wall includes a communication hole communicating a radially inside of the tubular wall with a radially outside of the tubular wall,
    a feed port is provided for lubricating oil and located radially inside of the second piston, and
    the second piston includes a communication passage radially passing through the second piston and communicating the feed port with the communication hole such that lubricating oil is supplied from the communication hole to the radially outside of the tubular wall when the second piston is in an initial position in which the second friction engagement element is in a released state.

2. The lubricating structure according to claim 1, wherein the first friction engagement element and the second friction engagement element are designed not to be in an engaged state at the same time.

3. The lubricating structure according to claim 1, wherein the second piston includes a plurality of spring-retention holes formed at intervals along a circumferential direction of the second piston,
    each of the plurality of spring-retention holes retains one end portion of a spring that biases the second piston toward the initial position, and
    the communication passage passes between circumferentially adjacent two of the plurality of spring-retention holes and thereby radially passes through the second piston.

4. The lubricating structure according to claim 1, wherein axial one end of the tubular wall is sealed,
    the second piston includes an arm portion which is located radially inside of the tubular wall and which extends along the tubular wall toward axial another end of the tubular wall,
    an outer circumferential portion of the arm portion includes a protruding portion protruding in a radially outer direction, the protruding portion being formed over an entire circumference of the arm portion,
    an inner circumferential portion of the tubular wall includes a contact portion formed over an entire circumference of the tubular wall, and
    the protruding portion becomes in contact with the contact portion in the axial direction when the second piston moves to the initial position.

5. The lubricating structure according to claim 1, wherein an inner tubular member and an outer tubular member are provided radially inside of the second piston,
    the inner tubular member includes a concave groove circumferentially extending in an outer circumferential portion of the inner tubular member,
    the outer tubular member covers the concave groove of the inner tubular member such that an oil passage for lubricating oil is formed between the inner tubular member and the outer tubular member, and
    the outer tubular member includes a plurality of feed ports which are formed at intervals along an circumferential direction of the outer tubular member and which radially pass through the outer tubular member.

* * * * *